(12) United States Patent
Spilling (10) Patent No.: US 12,357,093 B1
(45) Date of Patent: Jul. 15, 2025

(54) ACCESSORY DEVICE MOUNT FOR ELECTRONIC DEVICE FRAME

(71) Applicant: Brodit AB, Karlsborg (SE)

(72) Inventor: Bjorn H. Spilling, McFarland, WI (US)

(73) Assignee: Brodit AB, Karlsborg (SE)

( * ) Notice: Subject to any disclaimer, the term of this patent is extended or adjusted under 35 U.S.C. 154(b) by 0 days.

(21) Appl. No.: 18/651,422

(22) Filed: Apr. 30, 2024

(51) Int. Cl.
*A47B 97/00* (2006.01)
*F16M 13/00* (2006.01)

(52) U.S. Cl.
CPC ........... *A47B 97/00* (2013.01); *F16M 13/005* (2013.01); *A47B 2097/005* (2013.01)

(58) Field of Classification Search
CPC . A47B 97/00; A47B 2097/005; F16M 13/005
USPC ........................................................ 248/689
See application file for complete search history.

(56) References Cited

U.S. PATENT DOCUMENTS

| | | | |
|---|---|---|---|
| 6,229,893 B1 | 5/2001 | Chen | |
| 7,013,164 B2 | 3/2006 | Lin | |
| 8,177,178 B2 | 5/2012 | Carnevali | |
| 8,929,065 B2 | 1/2015 | Williams | |
| 9,647,474 B2 | 5/2017 | Fathollahi et al. | |
| 9,660,682 B2 | 5/2017 | Smith et al. | |
| 9,698,851 B2 | 7/2017 | Andrus | |
| 9,774,713 B2 | 9/2017 | Guerdum et al. | |
| 9,807,211 B2 | 10/2017 | Guerdum et al. | |
| 9,898,041 B2 * | 2/2018 | Blowers | E05B 73/0082 |
| 10,178,903 B2 | 1/2019 | Guerdum et al. | |
| 10,608,384 B2 | 3/2020 | Warren | |
| 10,767,810 B2 | 9/2020 | Yamamori et al. | |
| 10,810,570 B1 | 10/2020 | Martin et al. | |
| 11,029,731 B1 * | 6/2021 | Carnevali | H04B 1/3888 |
| 11,815,224 B1 * | 11/2023 | André | F16M 11/041 |
| 12,251,008 B2 * | 3/2025 | Nyberg | A45F 5/00 |
| 2005/0090301 A1 | 4/2005 | Lange et al. | |
| 2009/0152418 A1 | 6/2009 | Bury | |
| 2017/0227987 A1 | 8/2017 | Carnevali et al. | |
| 2022/0253097 A1 | 8/2022 | Carnevali et al. | |
| 2023/0121126 A1 | 4/2023 | Andler et al. | |

* cited by examiner

*Primary Examiner* — Todd M Epps
(74) *Attorney, Agent, or Firm* — Stiennon & Stiennon (57) ABSTRACT

Electronic accessories are attachable to electronic devices such as a tablet computer retained within a frame assembly by an accessory device mount which cooperates by a sliding block and slot connection. The accessory device mount has a knob which is rotatable to releasably latch the frame assembly to the accessory device mount and gives a sensible indication of the completed latching action. By rotating the knob the accessory device mount is unlatched and urged away from the frame assembly.

10 Claims, 9 Drawing Sheets

ACCESSORY DEVICE MOUNT FOR ELECTRONIC DEVICE FRAME

CROSS REFERENCES TO RELATED APPLICATIONS

Not applicable.

Statement as to Rights to Inventions Made Under Federally Sponsored Research and Development Not applicable.

BACKGROUND OF THE INVENTION

The present invention relates to devices for detachably mounting electronic devices in general, and more particularly to devices for rapidly mounting electronic devices to one another.

Tablet computers and mobile electronic devices are used in retail, construction, transportation, manufacturing, warehousing, healthcare, law enforcement and emergency medical services and wherever the electronic capabilities of payment terminals, printers, computers, tablets, cellphones, barcode scanners, GPS units, or other specialized apparatus are needed. Protective cases and frames not only provide a solid structure for carrying the devices in a variety of situations as well as mounting the electronic device within a vehicle, cart or workstation, but they also can shield often delicate devices from impact and abrasion.

The encased electronic device can be mounted to its place of use with screw fasteners or other arrangements requiring tools, but often the electronic device must be frequently removed from its mount, for example to accompany a vehicle driver making a delivery to a customer, to go with an emergency medical technician helping a patient, or to assist a material handler moving goods within a warehouse. In these mobile environments it is important that the encased electronic device can be rapidly and precisely inserted and removed from its mount. In addition, although many electronic devices are powered by internal batteries, it may be necessary to continuously supply power to the device and establish a data connection with a wireless network. Docking or charging stations provide for a secure and accurate connection and disconnection between electronic device frames and docking or charging bases.

Tablet computers and other multipurpose computers may accept a wide range of accessories, for example bar code scanners, cameras, wireless communication devices, printers, payment terminals and others. What is needed is an arrangement for repeatably and securely mounting accessories to electronic device frames which facilitates removal and exchange of accessories.

SUMMARY OF THE INVENTION

The accessory device mount of this invention is slidably attachable to a protective frame assembly which receives an electronic device such as a tablet computer. The accessory device mount is slidably engageable with the frame assembly by mounting blocks which engage mounting slots. The accessory device mount has rearwardly projecting structure which engages and retains an electronic accessory such as a card scanner or printer and thus secures the accessory to the frame assembly. In one embodiment, the accessory device mount has a knob which is rotatable to releasably latch the frame assembly to the accessory device mount and which gives a sensible indication of the completed latching action. By rotating the knob the accessory device mount is unlatched and urged away from the frame assembly. The mounting block may have deflectable opposed spring members each defined between a top plate slot and a side slot communicating with the top plate slot, the spring members being deflectable in response to forces applied in the cross direction, the spring members giving a secure and resilient connection.

It is an object of the present invention to provide a device for securely and readily mounting accessories to an electronic device frame.

It is a further object of the present invention to provide an accessory device mount for an electronic device which can receive accessories of a wide range of dimensions.

Further objects, features and advantages of the invention will be apparent from the following detailed description when taken in conjunction with the accompanying drawings.

DESCRIPTION OF THE PREFERRED EMBODIMENTS

Figure 2:
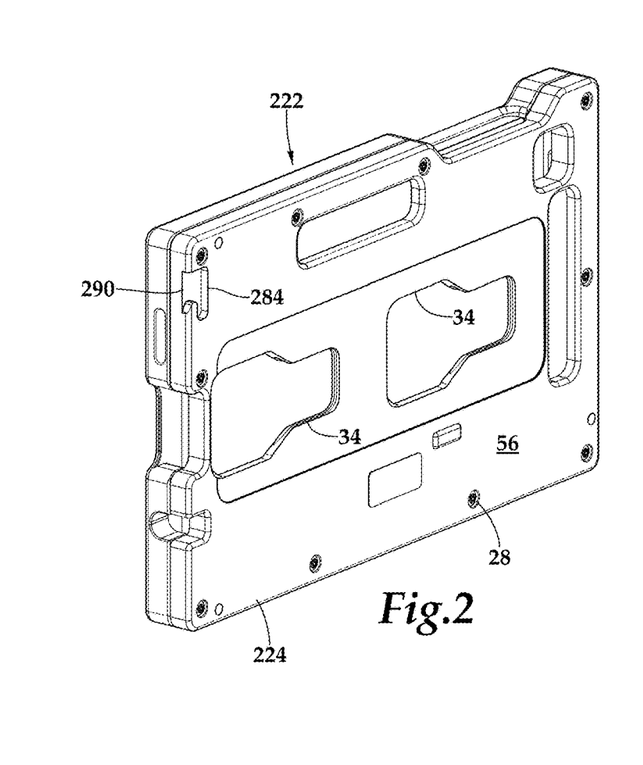
FIG. 2 is a rear isometric view of the electronic device frame of FIG. 1.
Figure 3:
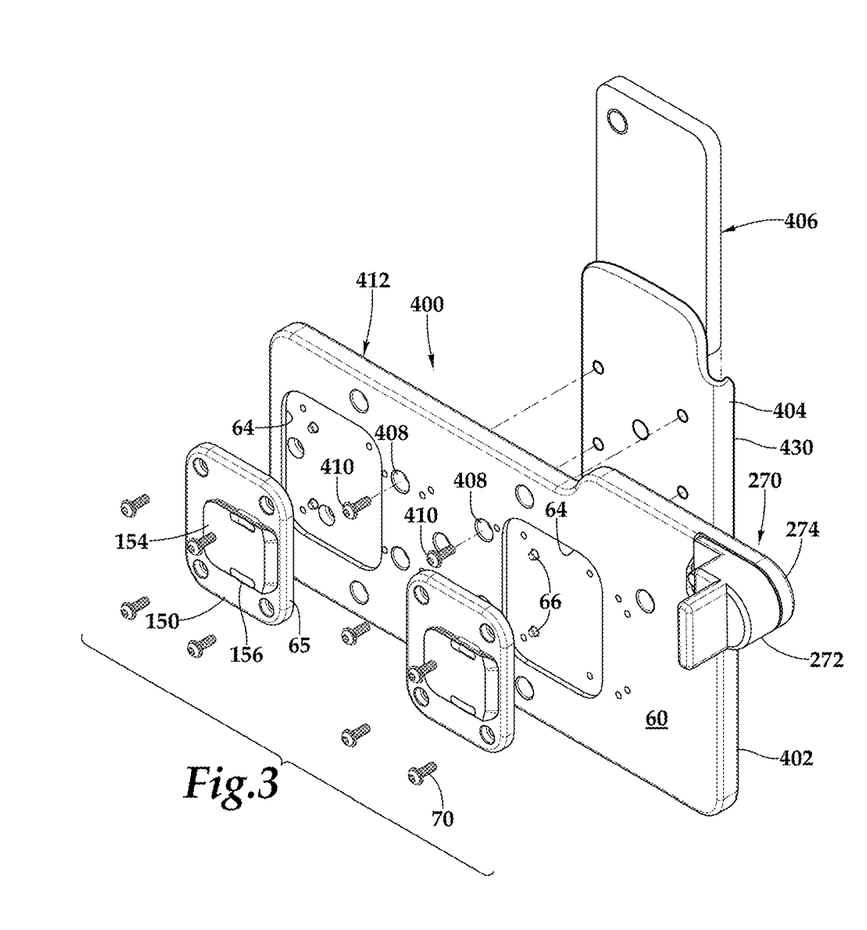
FIG. 3 is an exploded isometric of an accessory device mount of this invention for attachment to the electronic device frame of FIG. 2.

Referring more particularly to FIGS. 1-31, wherein like numbers refer to similar parts, an accessory device mount 400 is shown in FIG. 3. The accessory device mount 400 has an accessory plate 402 with mounting blocks 154 which engage with mounting slots 34 of a frame assembly 222, shown in FIG. 2, which holds an electronic device 21 such as a tablet computer. A projecting structure 404 is fixed to the accessory plate 402 and is shaped to engage and retain an accessory 406 such as a smartphone. A latch assembly 270 with a rotatable knob 272 serves to releasably fix the accessory device mount 400 to the frame assembly 222.

Figure 1:
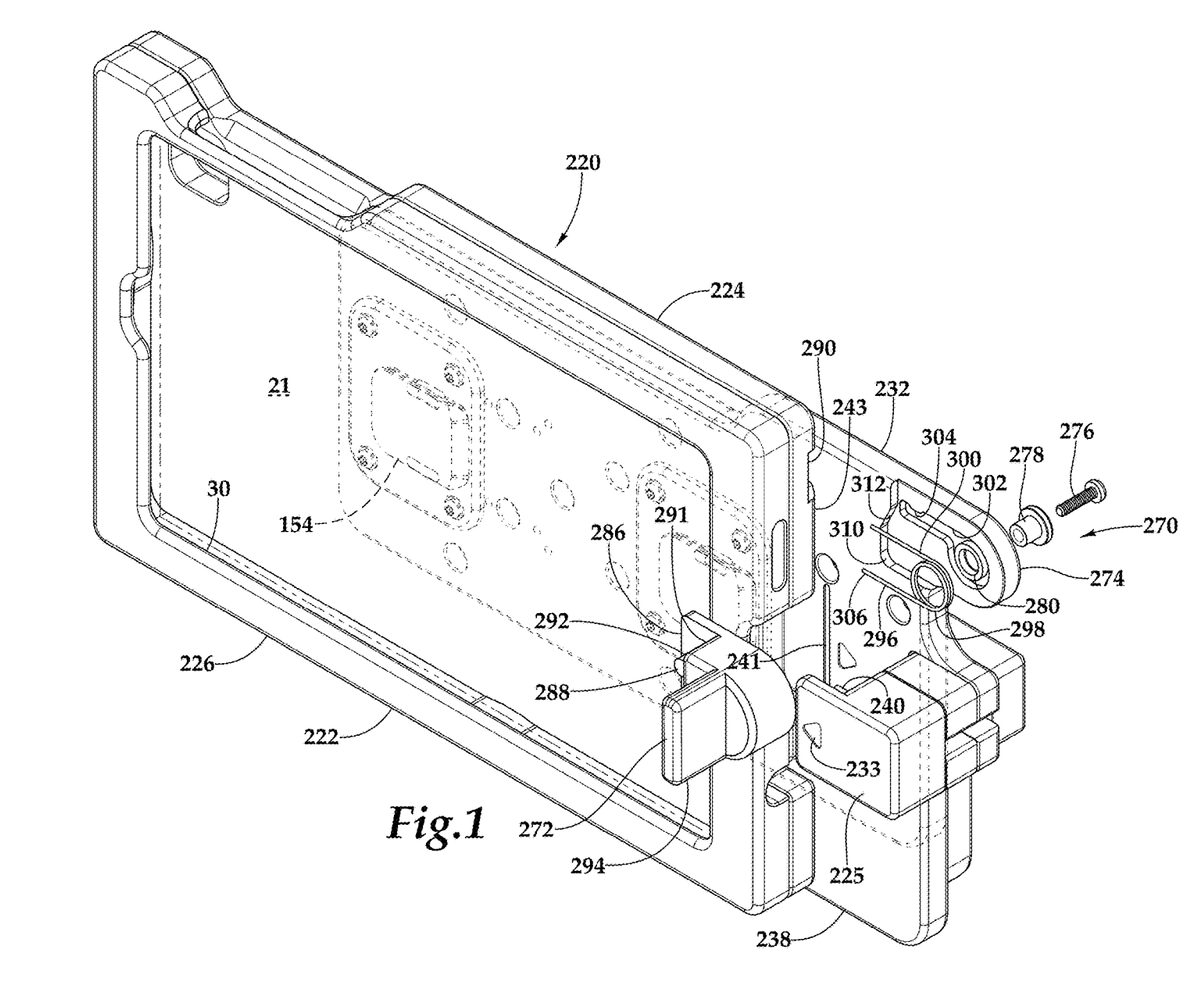
FIG. 1 is a front exploded isometric view of electronic device frame and docking base with quick disconnect.

The accessory device mount 400 may be used with a frame assembly 222 which is part of a docking station mounting assembly 220, shown in FIG. 1, such as is disclosed in U.S. Pat. No. 11,815,224, the disclosure of which is incorporated by reference herein. The frame assembly 222 securely engages and protects the electronic device 21. The frame assembly 222 has a back plate 224 and a frame 226 which connects to the back plate by screw fasteners 28, allowing the removable fastening of the electronic device 21 between the frame and the back plate such that a control or display surface of the device is accessible through a window opening 30 in the frame. When used as part of a docking base assembly, the frame assembly 222 is slidably received on a base assembly 232. The frame assembly 222 has mounting slots 34, and the base assembly 232 has mounting blocks 154 such as those on the accessory device mount 400. A pedestal 225 projects frontwardly from the base assembly 232 and presents a point of connection between a male plug 240 of the base assembly and the female port (not shown). The frame assembly 222 retains and protects the electronic device 21 and presents the device's female port for connection to the male plug 240.

The frame 226, back plate 224 and accessory plate may be machined or injection-molded parts, formed for example of ABS plastic.

As shown in FIG. 3, the back plate 224 of the frame assembly 222 has a rear surface 56 which faces the base assembly 232 (shown in FIG. 1) and is positioned to overlie the base plate 238 (as shown in FIG. 1) or the accessory device mount 400 (shown in FIG. 3) when connected thereto. The two mounting slots 34 are formed on the back plate 224 to open on the rear surface and may be machined into the back plate. The mounting slots 34 are aligned with one another to enable sliding engagement of the frame assembly 222 with the base assembly 232 or the accessory device mount 400.

The accessory device mount 400 is configured to connect to the frame assembly 222 in the same way as the base assembly 232. The frontwardly projecting mounting blocks 154 may be integrally formed with the accessory plate 402, or, as shown in FIG. 3, may be formed as a mounting block element 150 which has a block 154 protruding from a surrounding mounting block base 65. The bases 65 of the mounting block elements 150 are received in recesses 64 in the accessory plate 402. Positioning pins 66 extend frontwardly within the mounting block recesses 64 which are received within mating pin holes (not shown) in the mounting block element bases 65. The mounting blocks 154 may be fastened within the recesses 64 by screw fasteners 70. The two mounting blocks 154 are aligned and are spaced from each in other in the direction of sliding S (shown in FIG. 4) connection.

Figure 29:
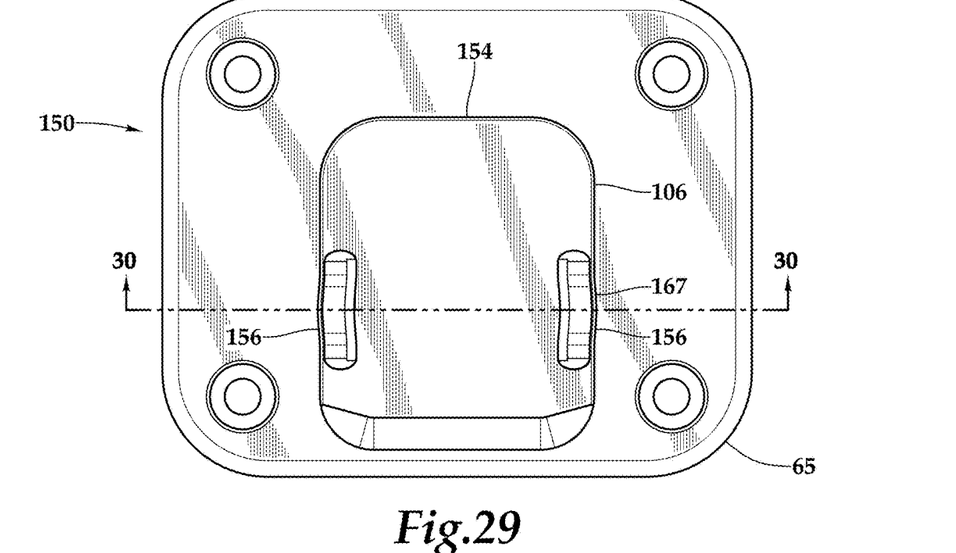
FIG. 29 is a top plan view of a mounting block of the accessory device mount of FIG. 3.
Figure 30:
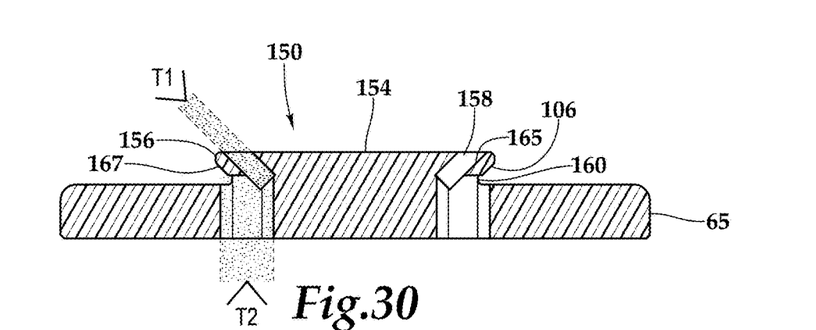
FIG. 30 is a schematic cross-sectional view of the mounting block of FIG. 29 taken along section line 30-30, with shaded regions showing two tool paths.
Figure 31:
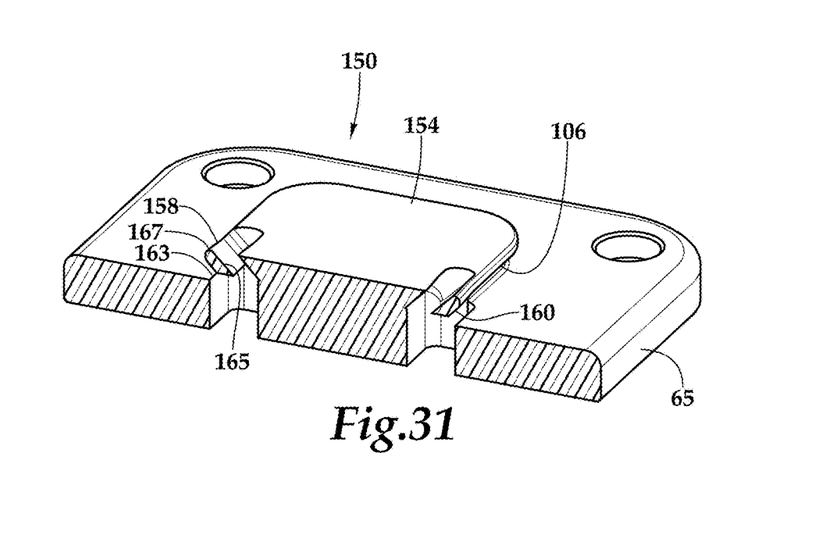
FIG. 31 is an axonometric view of the mounting block of FIG. 30.

As shown in FIGS. 29-31, the mounting block element 150 is a unitary plastic part which has a block base plate 65 of a shape to be received within the mounting block recess 64 of the mounting accessory plate 402 and held there by fasteners 70, as shown in FIG. 3. The mounting block element 150 has a mounting block 154 which projects frontwardly from the block base plate 65. Two deflectable spring members 156 are spaced in the cross direction on opposite sides of the mounting block 154. Each spring member 156 is defined between a top plate slot 158 extending through the upper face of the mounting block, and a side slot 160 positioned beneath the spring member and extending sidewardly into the block and communicating with the top plate slot 158. The spring members 156 are deflectable in response to forces applied in the cross direction. Each mounting block 154 has opposed side ridges 106 which project in the cross direction and which run along the mounting block in the first direction. Each side ridge has a portion 167 which is a part of a spring member. The spring members 156 thus deflect inwardly when the mounting block is engaged with a mounting slot, contributing to a snug connection between the parts. As shown in FIG. 29, the spring member has an inclined inner wall 165 which extends downwardly and in the cross direction and is defined between the top plate slot 158 and the side slot 160. The spring member side ridge portion 167 is continuous with the remainder of the side ridge 106, but protrudes outwardly in the cross direction, such that the spring member 156 is compressed in the cross direction when the block is received within a mounting slot 34. As shown in FIG. 30, the spring members 156 may be formed with cutting tools which advance along two tool paths. Path T1 extends downwardly and is angled in the cross direction and path T2 enters from the underside of the block and extends substantially vertically upwardly to form a continuous passageway 163 which extends through the block.

Figures 4, 5, 6, 7, 8, 9:
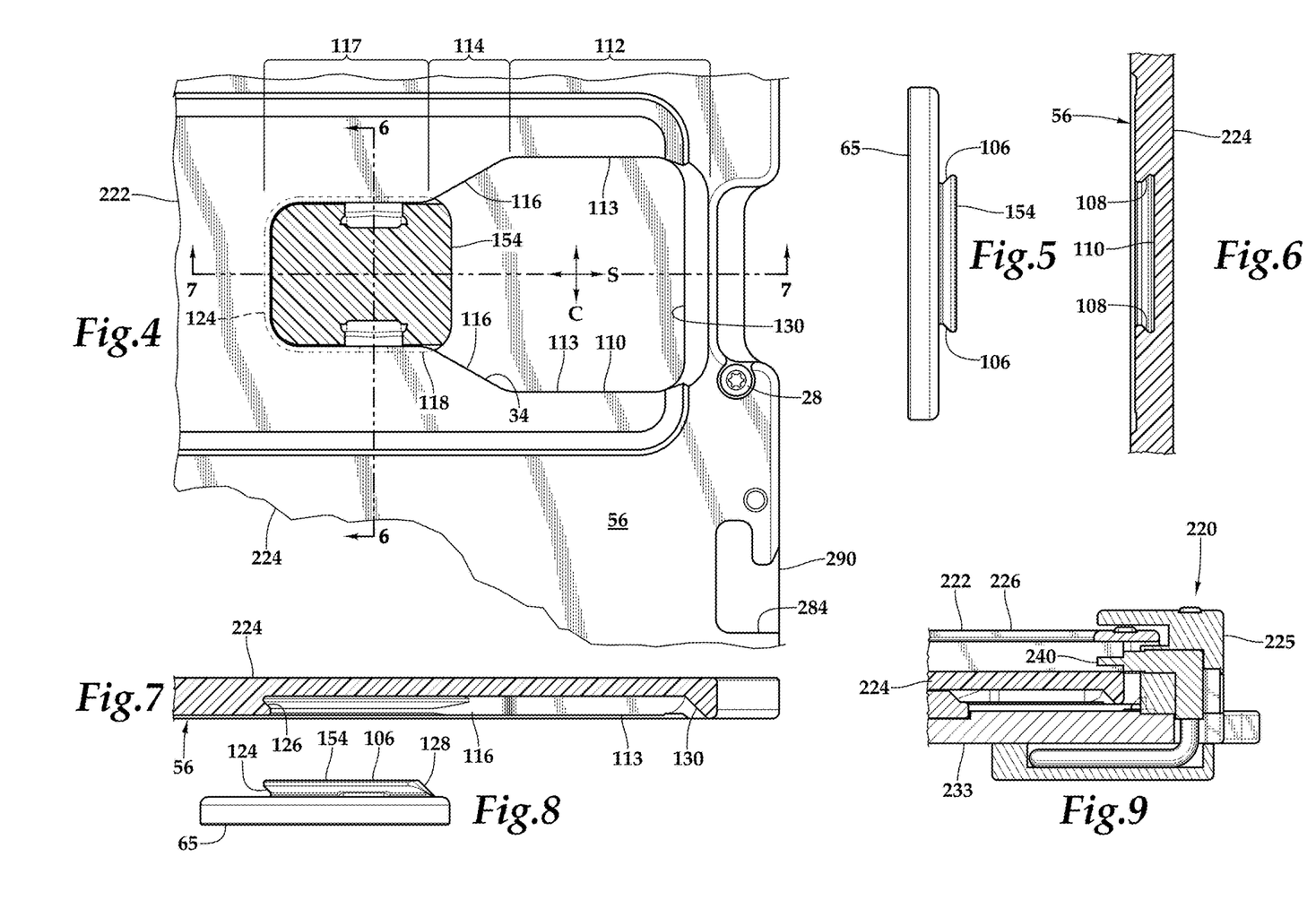
FIG. 4 is a fragmentary bottom elevational view of the frame assembly of FIG. 2, with a portion of a base mounting block received within a mounting slot.
FIG. 5 is an end view of the mounting block of FIG. 4.
FIG. 6 is a fragmentary cross-sectional view of the frame assembly of FIG. 4 taken along section line 6-6.
FIG. 7 is a fragmentary cross-sectional view of the frame assembly of FIG. 4 taken along section line 7-7.
FIG. 8 is a side elevational view of the mounting block of FIG. 4.
FIG. 9 is a fragmentary cross-sectional view of the frame assembly mounted to the base assembly of FIG. 4, taken along section line 7-7.
Figure 10:
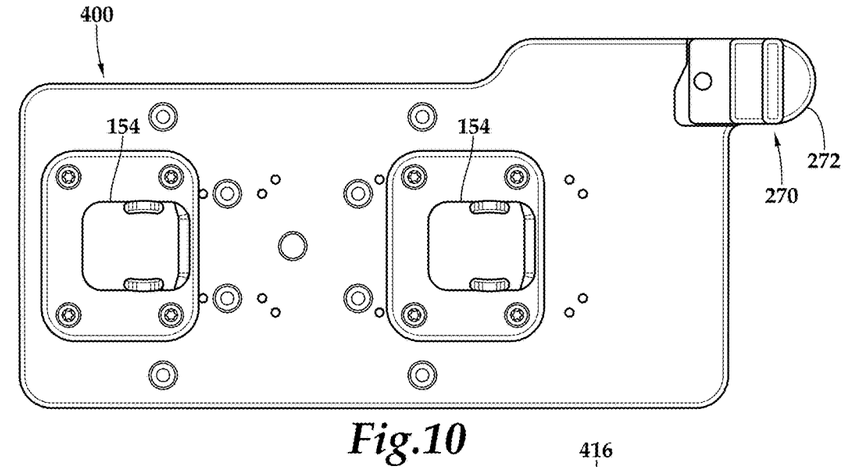
FIG. 10 is a top plan view of the accessory device mount of FIG. 3 having a knob release.

As shown in FIGS. 4-9, the sliding connection between the frame assembly 222 and the accessory device mount 400 (or the base assembly) is controlled by the shapes of the mounting slots 34 and the mounting blocks 154 to guide the attachment. It is desirable that the connection process, often carried out within a vehicle under poor lighting, perhaps in motion, and with only one hand, be error tolerant and secure. As shown in FIG. 4, the mounting slots 34 and blocks 154 cooperate in such a way as to accept significant mismatches in the initial positioning and direct the pieces to a snug and accurate final position.

As shown in FIGS. 5 and 6 each mounting block 154 has side ridges 106 which extend in the sliding direction S and are shaped to be received within side groove lips 108 of a mating mounting slot 34. As shown in FIG. 6, the side groove lips 108 also extend in the sliding direction, and the two converging spaced side lips extend towards one another in the cross direction C perpendicular to the sliding direction S (shown in FIG. 3), thereby defining an engagement recess 110 frontward of the side lips and shown in FIGS. 4 and 6. The mounting block side ridges 106, shown in FIG. 5, extend outwardly in the cross direction to engage within the engagement recess when the frame assembly 222 is mounted to the accessory device mount 400. A comparable connection between the frame assembly 222 and the base assembly 232 is shown in FIG. 9. The engagement of the mounting blocks within the mounting slots serves to limit vertical separation of the device accessory mount from the frame assembly. As shown in FIG. 4, the mounting slot 34 has three segments which guide the assembly of the frame assembly 222 to the accessory device mount 400 from a rough alignment to a precise alignment. An entry segment 112 is the widest portion in the cross direction of the mounting slot having the most widely spaced side walls 113. A positioning segment 114 of the mounting slot extends from the entry segment, and in the positioning segment the width of the mounting slot is reduced by slot side walls 116 which converge in the cross direction, leading to an engagement segment 117 where the mounting block 154 is snugly received in the mounting slot 34 with the desired final position.

Thus the entry segment 112 communicates with the engagement segment 117 by the positioning segment 114. The positioning segment 114 has guide lips 118 which are positioned after the entry segment side walls 113 and continue to the side groove lips 108. The guide lips converge in the cross direction to engage the side ridges 106 of the mounting block 14 and bring them beneath the side groove lips 108 within the engagement recess 110. The three segments 112, 114, 116 are progressively narrower in the cross direction, such that the user can begin the connection of the parts with a rough positioning when the mounting blocks 154 are inserted into and received within the entry segments 112 of the mounting slots 34. By moving the frame assembly 222 in the sliding direction with respect to the accessory device mount 400, the mounting blocks 154 are brought into engagement with the guide lips 118 of the positioning segment which join the side groove lips 108 for aligning the mounting blocks within the engagement recess 110, as shown in FIG. 4.

As shown in FIG. 3, the two mounting blocks 154 are positioned aligned in the sliding direction S. The mounting slots 34 are spaced apart the same amount as the blocks are spaced in the sliding direction. In the connection of the frame assembly 222 to the accessory device mount 400, the rear surface 56 of the frame assembly back plate 224, shown in FIG. 2, is brought generally parallel to the front surface 60 of the accessory plate 402 and the mounting blocks enter the mounting slots within the entry segments, thereby preparing the mounting blocks for sliding engagement with the mounting slots. To the extent that the blocks are not aligned in the cross direction, the converging portions of the slots and the blocks bring about proper alignment as the frame assembly is slid towards engagement. As shown in FIG. 4, when the end walls 124 of the mounting blocks abut the end walls 126 of the mounting slots, the frame assembly is fully positioned with respect to the accessory device mount and further travel in the sliding direction is prevented. As shown in FIGS. 7 and 8, the mounting block end wall protrudes in the sliding direction S to engage within a mating recess defined by the end wall 126 of the mounting slot.

When a user wishes to remove the accessory from the frame assembly 222, the knob of the latch assembly 270 is operated, which urges the two pieces apart in the sliding direction allowing the user to further slide the accessory device mount 400 away from the frame assembly for separation. To facilitate this separation, the mounting blocks 154 each have an inclined base camming out surface 128, shown in FIG. 8, and the mounting slots 34 (shown in FIGS. 4 and 7) each have an inclined frame camming out surface 130. When the user slides the frame assembly 222 in the sliding direction S, the frame camming out surfaces 130, shown in FIG. 4, engage the accessory device mount camming out surfaces 128, shown in FIG. 8, to direct the frame assembly in a frontward direction with respect to the base assembly to facilitate separation.

A similar latch assembly 270 may be used on the accessory device mount 400 and the base assembly 232. As shown in FIG. 1, the latch assembly 270 has a latch member or knob 272 which is rotatably mounted to a sidewardly protruding tab 274 which extends from the base plate 238 or the accessory plate 402. The knob 272 is mounted by a threaded screw fastener 276 which extends through a flanged plastic bushing 278 positioned in a mounting hole 280 in the mounting tab 274 and is threaded into a threaded opening 282 in the knob 272 shown in FIG. 25. The knob 272 is operable to engage the frame assembly 222 when the frame assembly is slid along the base plate 238 or the accessory plate to latch the frame assembly in a latched configuration. The latch assembly 270 is further operable to unlatch the frame assembly from the accessory device mount 400.

Figure 25:
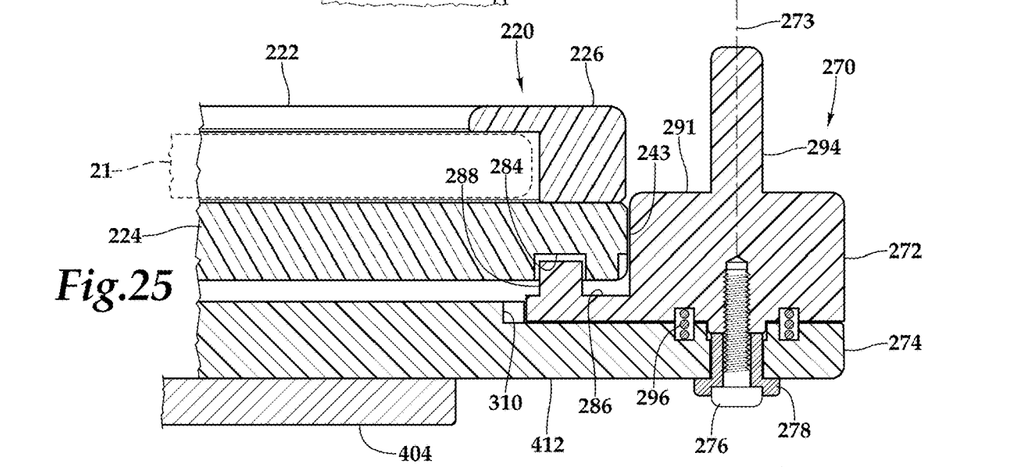
FIG. 25 is a fragmentary cross-sectional view of the device of FIG. 24 taken along section line 25-25, showing the fully latched position.
Figure 26:
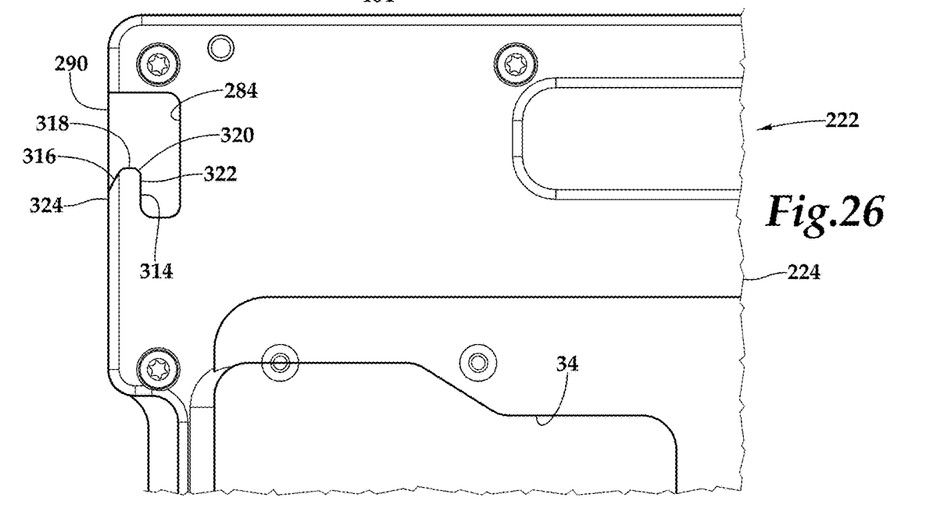
FIG. 26 is a rear plan view of the frame assembly of the device of FIG. 3.

As shown in FIG. 25, the back plate 224 of the frame assembly has a rearwardly facing latch slot 284. As shown in FIG. 26, the latch slot 284 has a mouth 290 which opens towards the knob 272, shown in FIG. 25, along the leading end wall 243 of the back plate 224.

Figure 24:
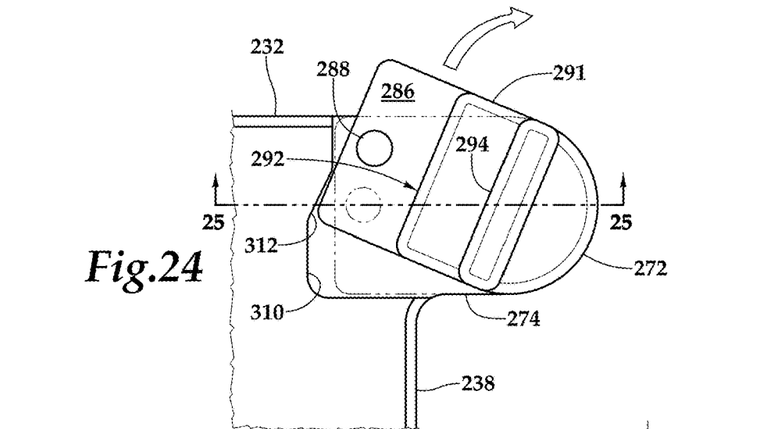
FIG. 24 is a fragmentary plan view of the accessory device mount of FIG. 3, showing the knob in the full release position, and the knob shown in phantom line in a fully latched position.

The knob 272 is rotatably mounted to the accessory plate 402 to rotate about an axis 273 extending in the vertical direction. As shown in FIG. 24, the knob 272 has a sidewardly protruding shelf 286 which projects from the knob to extend between the frame assembly 222 and the accessory plate 402 when the frame assembly is slidably engaged with the accessory device mount 400. The knob shelf 286 has a cylindrical post 288 which extends frontwardly from the shelf 286 for entrance into the mouth 290 of the latch slot 284 as shown in FIG. 25. As shown in FIG. 24, the knob 272 has a frontwardly projecting ejector member 291 with an ejector wall 292 which faces the back plate leading end wall 243, as shown in FIG. 25. A handle 294 projects frontwardly from the knob 272 for engagement by a user to facilitate rotation of the knob.

Figure 13:
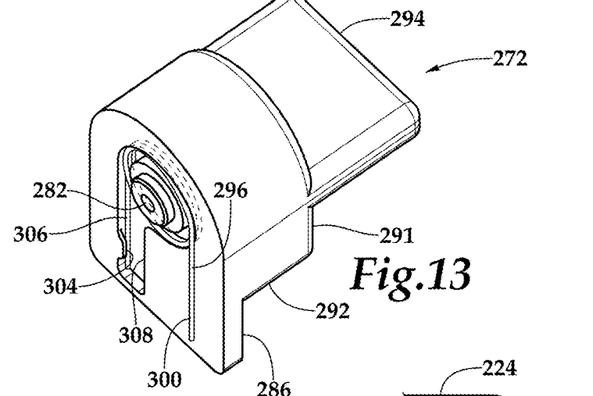
FIG. 13 is a rear isometric view of the knob and spring of the latch of the accessory device mount of FIG. 3.

As shown in FIG. 13, a torsion spring 296 is positioned between the knob 272 and the accessory plate 402. As shown in FIG. 1, the spring 296 has a coil 298 with a first leg 300 which is received within a spring recess 302 on the base mounting tab 274 and a second leg 306 which is received within a spring recess 308 on the underside of the knob 272, as shown in FIG. 13. Each leg 300, 306 is retained within its associated spring recess 302, 308 by a narrow undercut flange 304. As shown in FIGS. 24, the knob is thus retained for rotation within a knob depression 310 formed in the accessory plate 402. The knob depression 310, also shown in FIG. 1 in the base assembly configuration, is configured to allow free rotation of the knob and the projecting shelf 286. As shown in FIG. 24, the knob depression has a limit wall 312 at its perimeter which limits the extent of knob rotation. The spring 296 urges the knob 272 into a position which latches the accessory device mount 400 to the frame assembly.

Figure 14:
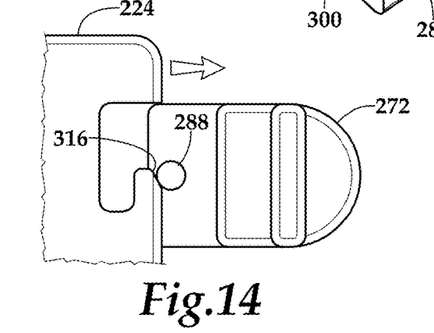
FIGS. 14-19 are schematic views showing the operation of the latch of the device of FIG. 3 as the accessory device mount is secured to electronic device frame of FIG. 2.
Figure 15:
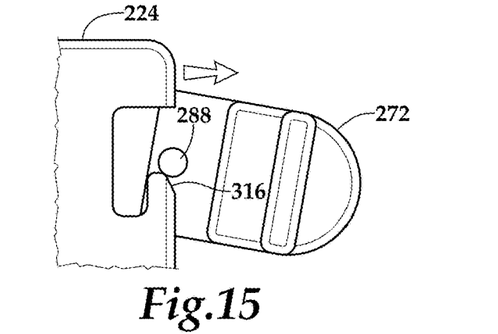
Figure 16:
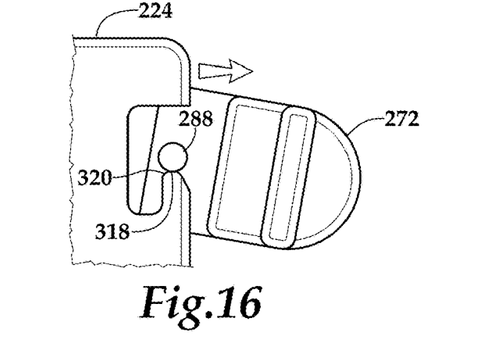
Figure 17:
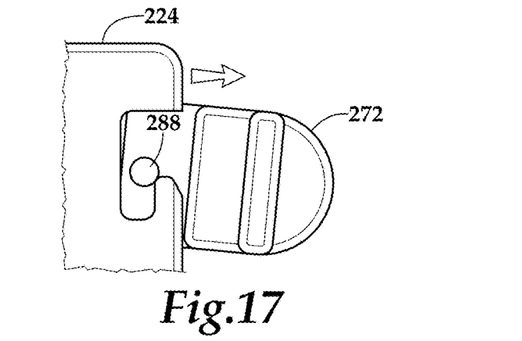

As shown in FIG. 26, the latch slot 284 has a perimeter 314 which includes wall segments which interact with the knob post 288, shown in FIG. 25, to latch the frame assembly 222 to the accessory device mount (or the base assembly) as the frame assembly is slid into the latched position, and to eject the frame assembly when the knob 272 is rotated. The latch slot 284 opens towards the post 288. As shown in FIG. 26, the interior perimeter 314 of the slot has a first segment 316 at the mouth 290 which functions as an inlet ramp to the latch slot. The direction of sliding motion of the frame assembly with respect to the attached part is a first direction, and a cross direction is defined perpendicular to the first direction. The inlet ramp first segment 316 of the latch slot perimeter 314 extends in both the first direction and the second direction. The schematic views of FIGS. 14-23 show the relationship between the knob 272 and the latch slot 284 as the frame assembly is latched to the accessory device mount (FIGS. 14-19) and as it is ejected therefrom (FIGS. 20-23). Note that the device is shown schematically in FIGS. 14-29 and for clarity not all parts are illustrated. For the following discussion the movement of the parts is illustrated in the schematic figures, but attention is directed to FIGS. 25 and 26 for the structural details. As shown in FIG. 14, as the frame assembly with its back plate 224 is slid along the accessory plate 402 its motion is constrained by the engagement of the mounting blocks and mounting slots to move exclusively in the first direction. When the leading end wall 243 of the frame assembly back plate 224 engages the post 288, it is the first segment 316 of the latch slot perimeter which makes initial contact. The inclined first segment 316 forces the knob to pivot as shown in FIG. 15 and the post 288 travels along the first segment to a second segment 318 of the latch slot perimeter wall, as shown in FIG. 16. The second segment 318 extends in the first direction and joins a third segment 320 which is an inclined segment extending in the first direction and the cross direction. As the frame assembly 222 continues its progress in the first direction, as shown in FIG. 17, the post 288 continues to be engaged with the latch slot perimeter 314 under the urging of the spring 296.

Figure 18:
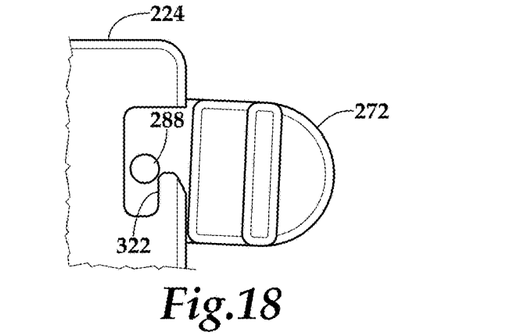
Figure 19:
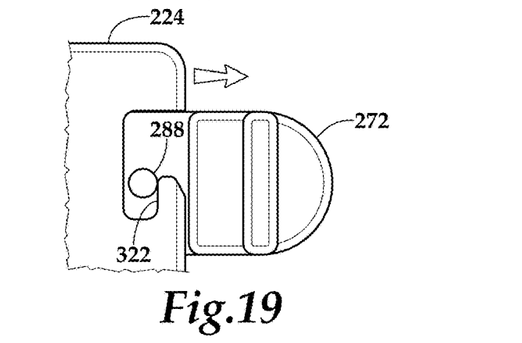

The third segment 320 of the perimeter wall is continuous with a fourth segment 322 of the latch slot perimeter 314 which extends strictly in the cross direction. Once the post 288 clears the third segment 320 as shown in FIGS. 18-19, the spring 296 restores the knob 272 to its initial position and the post rapidly moves to its latched configuration. This rapid movement to the terminal position of the knob produces a sensible noise or click which confirms to the operator of the device that the frame assembly 222 is now securely latched to the accessory device mount 400. An intervening finger 324 of the back plate 224 is defined between the first inlet ramp segment 318 and the fourth retention segment 322 and this finger is positioned between the post 288 and the ejector wall 292 of the knob 272. The finger 324 prevents the escape of the post 288 and hence separation of the accessory from the frame, so long as the knob is in its unrotated condition.

Figure 20:
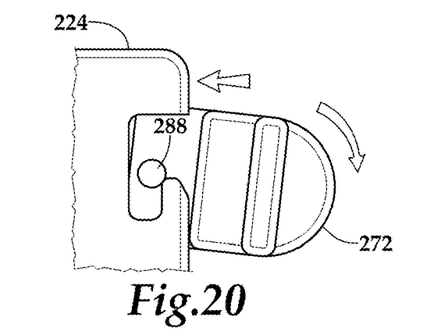
FIGS. 20-23 are schematic views showing the operation of the latch of the accessory device mount of FIG. 3 it is released from the electronic device frame of FIG. 2.
Figure 21:
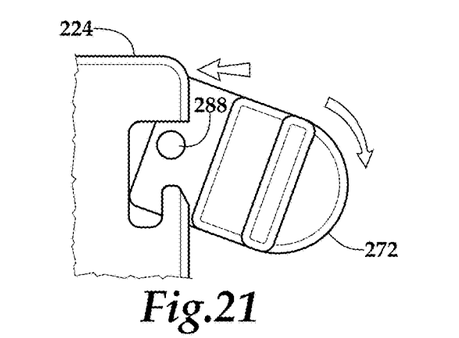
Figure 22:
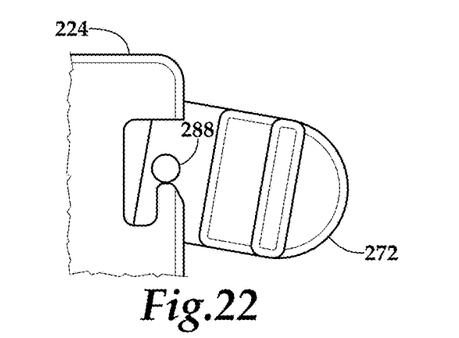
Figure 23:
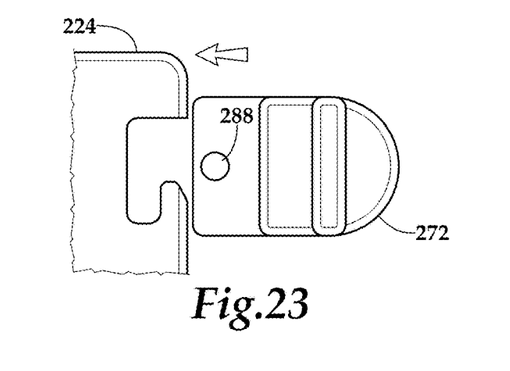

When a user desires to separate the frame assembly 222 and the accessory, the handle 294 of the knob 272 is engaged and rotated as shown in FIGS. 20-23 to not only release the latch but to partially eject the frame assembly. As shown in FIG. 20, the rotation of the knob 272 brings the post 288 along the fourth wall segment 322 to engage the third inside ramp segment 320. In this position, the rotated ejector wall 292 of the ejector member 291 of the knob 272 engages the leading end wall 243 of the back plate 224 and urges the frame assembly 222 in the first direction out away from the pedestal 225. Continued rotation of the knob 272 moves the post 288 out of contact with the latch slot perimeter wall 314 as shown in FIG. 21, and continued engagement of the ejector wall 292 moves the frame assembly 222 further away from the pedestal in the first direction, until the shelf 286 of the knob engages the limit wall of the knob depression 310 as shown in FIG. 24. If the user releases the knob 272 when the frame assembly is in this position, the spring 296 will urge the post 288 into engagement with the latch slot perimeter wall, as shown in FIG. 22, but, because of the partially ejected configuration, the post will engage the second rest segment 318 of the perimeter wall, and the frame assembly will not be latched. The frame assembly 222 and accessory device mount 400 are now in a fully unlatched configuration, but are still fully retained together. The user may then slide apart the two elements, separating the accessory from the electronic device by sliding in the first direction until the mounting slots are out of engagement with the mounting blocks and the accessory device mount can be fully removed from the frame assembly.

When a user desires to mount an accessory such as a scanner, card reader or printer, to a frame assembly with an electronic device such as a tablet computer, the user selects a projecting structure 404 which is configured to receive the particular accessory desired. The projecting structure 404 may have, for example, projecting side walls or tabs 430 which receive the accessory 406 in a friction fit, or the projecting structure may connect to the accessory by other resilient attachment or by fasteners. The projecting structure 404 may be fastened to the accessory plate 402 by the screw fasteners 410 so that it projects from the back surface 412 of the accessory plate 402. The back surface 412 may be a substantially flat surface which does not interfere with placement of the projecting structure 404, and, where the accessory plate 402 is sufficiently large, may receive more than one projecting structure and hence more than one accessory.

It should be noted that although the mounting slots are shown positioned on the frame assembly and the mounting blocks positioned on the base assembly, the positioning may be reversed.

Alternative embodiment accessory device mounts may be provided having one or two mounting blocks 154 and employing either a knob activated latch assembly 270 or a screw attachment between the frame assembly and the accessory device mount. The accessory device mount 400, shown in FIGS. 3 and 10 has an accessory plate 402 which supports two mounting blocks 154 and has a knob latch assembly 270. The accessory plate 402 is preferably provided with a plurality of countersunk attachment holes 408 which allow screw fasteners 410, shown in FIG. 3, to be inserted on the front side of the plate (the same side as the mounting blocks) to secure one or more projecting structures 404 to the back surface 412 of the accessory plate, as shown in FIG. 25. Thus a user may attach, for example, a credit card scanner to one portion of the accessory plate, and a printer on the other side. A user might then readily convert a tablet computer for providing service to customers in their vehicles.

Figure 12A:
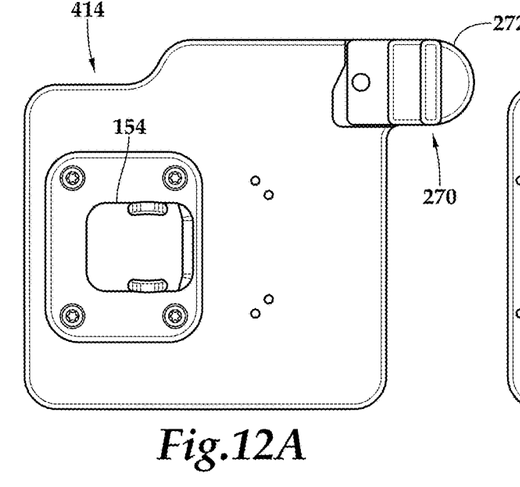
FIG. 12A is a top plan view of another alternative embodiment accessory device mount of this invention having a single mounting block and a knob release.

An alternative embodiment accessory device mount 414, shown in FIG. 12A, has only a single block 154 and a knob latch assembly 270, providing a more compact arrangement for mounting a single accessory, or smaller accessories.

Figure 11:
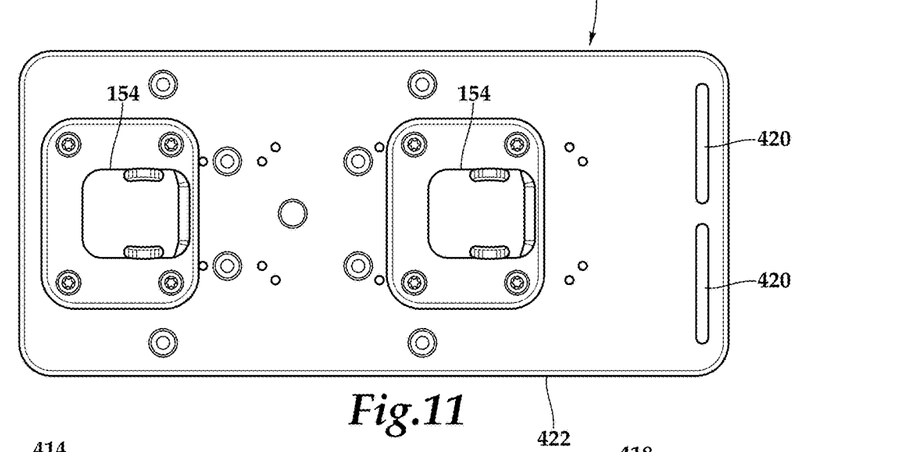
FIG. 11 is a top plan view of an alternative embodiment accessory device mount of this invention having a screw mounting slot.
Figure 12B:
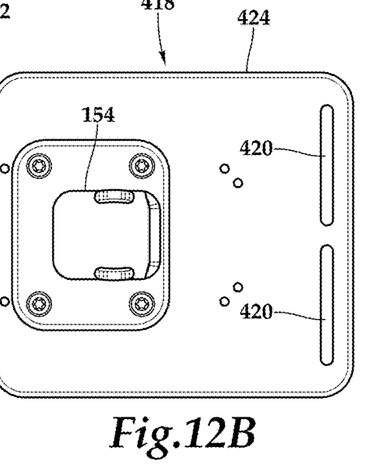
FIG. 12B is a top plan view of yet another alternative embodiment accessory device mount of this invention having a single mounting block and a screw mounting slot.
Figure 27:
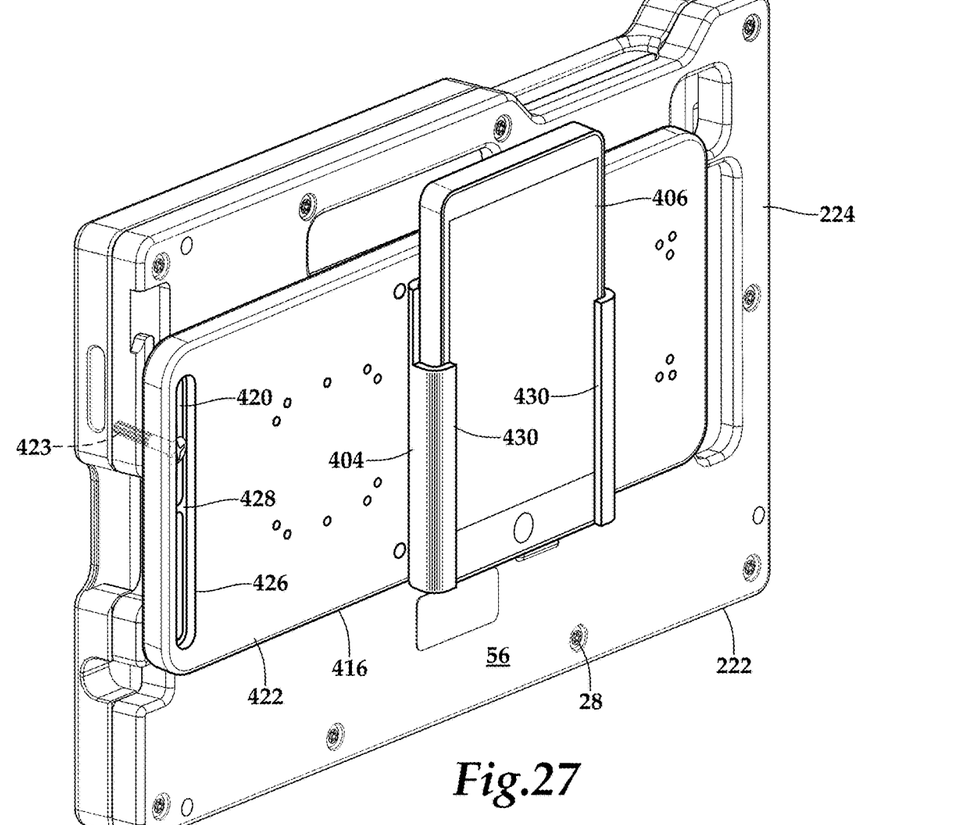
FIG. 27 is a rear isometric view of the alternative embodiment accessory device mount of FIG. 11 mounted to the electronic device frame of FIG. 2, and supporting an accessory thereon.
Figure 28:
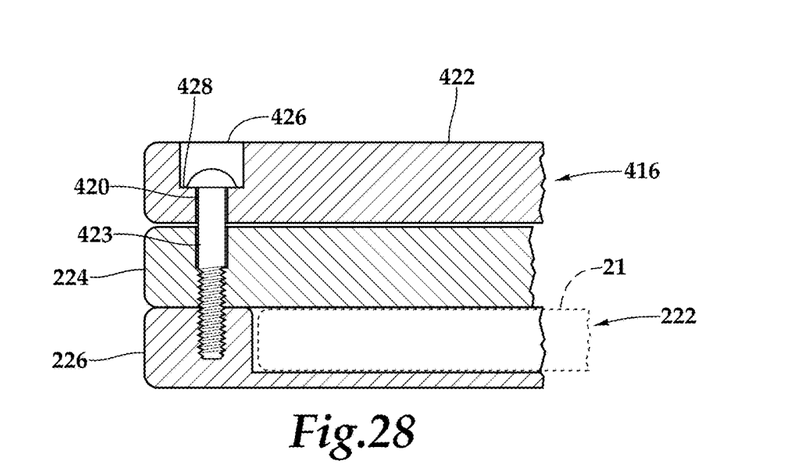
FIG. 28 is a fragmentary cross-sectional view of the accessory device mount of FIG. 27 mounted to the frame assembly and taken along section line 28-28.

Alternative embodiment accessory device mounts 416, 418 have two or one mounting blocks 154 and are generally similar to the accessory device mounts 400 and 414 with the difference that the knob latch assembly is omitted. The accessory device mount 416 is shown in FIG. 11, and the accessory device mount 418 is shown in FIG. 12B. For securing to the frame assembly, as shown in FIGS. 27 and 28, the accessory device mounts 416 and 418 are connected to the frame assembly 222 by one or more screw fasteners 423 which extend through attachment slots 420 aligned along an outside edge of the accessory plates 422, 424. As shown in FIGS. 11 and 12B two attachment slots are aligned with one another opening on the front face of the accessory plate. A single access slot 426 extends across both attachment slots 420 on the rear of the accessory plate as shown in FIG. 27. Similar to a counterbore hole, the access slot extends to a recessed narrow ledge 428 to allow the fasteners to be secured against the ledge 428 so the heads of the fasteners do not protrude beyond the accessory plate. As shown in FIG. 28, the screw fastener 423 extends through the attachment slot 420 into an existing hole in the frame assembly. The length of the attachment slot allows attachment of the fastener into variously positioned mating holes in the frame assembly 222. In the example shown, the fastener 423 takes the place of a fastener which connects the frame 226 to the back plate 224 of the frame assembly 222, and hence it is configured to extend through the slot 420 and into threaded engagement with both the frame and the back plate. However, it should be noted that the screw need only engage with the back plate. The accessory device mounts 414 and 416 may be used when there is less frequent disconnecting of the accessory from the frame assembly.

It is understood that the invention is not limited to the particular construction and arrangement of parts herein illustrated and described, but embraces all such modified forms thereof as come within the scope of the following claims.

I claim:

1. An accessory device mount for attachment to a frame assembly configured to retain an electronic device therein and having a back plate with a rearwardly facing recessed first slot, and a sidewardly opening latch slot; the accessory device mount comprising:
    an accessory plate;
    a first mounting block which projects frontwardly in a vertical direction from the accessory plate for sliding engagement in a first direction within the recessed first slot of the frame assembly back plate;
    an accessory mounting structure which projects rearwardly from the accessory plate for engaging an electronic accessory;
    a knob rotatably mounted to the accessory plate about a rotation axis extending in the vertical direction, and rotatable between a latched position and an unlatched position, the knob having a shelf which extends from an ejector member;
    a post which extends upwardly from the shelf of the knob in the vertical direction, wherein the frame assembly latch slot opens at a mouth towards the post in the first direction and the post is positioned to engage and enter the latch slot as the frame assembly is slid in the first direction with the first block engaged within the recessed slot;
    a spring disposed between the knob and the accessory plate and acting to urge the knob into the latched position in which the post is received within the frame assembly latch slot; and
    wherein sliding movement of the accessory plate with respect to the frame assembly in the first direction engages the accessory device mount with the frame assembly to rotate the knob to cause the post on the shelf of the knob to enter the latch slot and thereby releasably latch the accessory device mount to the frame assembly.

2. The accessory device mount of claim 1 wherein the shelf is configured to project from the knob to extend between the frame assembly and the accessory plate when the frame assembly is slidably engaged with the accessory device mount.

3. The accessory device mount of claim 2 wherein the accessory device mount is configured to engage with the frame assembly in which the back plate has a leading end wall which faces the knob, and wherein the mouth of the latch slot opens on the leading end wall, and wherein the knob ejector member has a frontwardly projecting ejector wall which faces the back plate leading end wall and which is spaced in the first direction from the post, and wherein the knob is positioned on the base assembly such that rotation of the knob in a latched configuration releases the post from within the latch slot and urges the ejector wall against the back plate leading end wall to urge the accessory device mount in the first direction away from its latched position.

4. The accessory device mount of claim 3 further comprising a handle which projects frontwardly from the knob for engagement by a user to facilitate rotation of the knob.

5. The accessory device mount of claim 3 which is configured to cooperate with the frame assembly in which the latch slot has an interior perimeter having a first segment at the mouth which extends in the first direction and wherein a cross direction is defined perpendicular to the first direction, the first segment positioned to engage the post when the frame assembly is urged towards the knob in the first direction, and further comprising:
    wherein the latch slot perimeter has a retention wall segment which is spaced in the first direction from the first segment, such that when the frame assembly is slid in the first direction in engagement with the base assembly, the latch knob post enters the mouth of the latch slot and travels in the cross direction along the first segment, and passes into the latch slot and is retained by the retention wall in a position spaced from the first segment.

6. The accessory device mount of claim 1 further comprising a second mounting block which projects frontwardly in a vertical direction from the accessory plate for sliding engagement in the first direction within a recessed second slot of the frame assembly back plate, the second mounting block being spaced in the first direction from the first mount block.

7. The accessory device mount of claim 1 wherein the accessory mounting structure is fixed to the accessory plate by a plurality of fasteners and includes tabs for engaging an accessory in a friction fit.

8. A mounting assembly for an electronic device and a device accessory comprising:
    a frame assembly configured to retain an electronic device therein, the frame assembly having a front plate with an opening therein through which the screen of the electronic device is viewable and a rearwardly facing back plate which is secured to the front plate for retaining the electronic device therebetween, wherein a vertical direction is defined extending between the front plate and the rear plate;

an accessory device mount positioned rearwardly of the back plate of the frame assembly, the accessory device mount having rearwardly extending structure which is configured to engage an accessory which it is desired to releasably connect to the frame assembly;

a first mounting block having portions projecting in the vertical direction into a first mounting slot, wherein the first mounting block is fixed to one of the accessory device mount and the back plate, and the first mounting slot is positioned on the other of the base plate and the accessory device mount to form a sliding connection in a first direction between the accessory device mount and the frame assembly, the first direction being perpendicular to the vertical direction; and wherein the first mounting slot is positioned for sliding engagement with the first mounting block in the first direction, such that sliding movement of the frame assembly with respect to the accessory device mount in the first direction engages the frame assembly with the accessory device mount; and a knob rotatably mounted to the accessory plate about a rotation axis extending in the vertical direction, and rotatable between a latched position and an unlatched position; and wherein the frame assembly back plate has a leading end wall having a latch slot with a mouth which faces the knob when the accessory device mount is engaged with the frame assembly, and wherein the mouth of the latch slot opens towards the knob to receive portions of the knob therein, wherein movement of the accessory device mount in the first direction engages portions of the knob within the latch slot to latch the accessory device mount to the frame assembly, and wherein the knob is positioned on the accessory device mount such that rotation of the knob in a latched configuration releases the knob from engagement with the latch slot and urges the accessory device mount in the first direction for release from the frame assembly.

9. The mounting assembly of claim 8 further comprising:

portions of the knob which define a shelf which extends from an ejector member;

a post which extends upwardly from the shelf of the knob in the vertical direction, wherein the frame assembly latch slot opens at the mouth towards the post in the first direction and the post is positioned to engage and enter the latch slot as the frame assembly is slid in the first direction with the first mounting block engaged within the first mounting slot;

a spring disposed between the knob and the accessory plate and acting to urge the knob into the latched position in which the post is received within the frame assembly latch slot; and wherein sliding movement of the accessory plate with respect to the frame assembly in the first direction engages the accessory device mount with the frame assembly to rotate the knob to cause the post on the shelf of the knob to enter the latch slot and thereby releasably latch the accessory device mount to the frame assembly.

10. The accessory device mount of claim 8 further comprising:

a second mounting block which projects in the vertical direction; and a second mounting slot, wherein the second mounting block is fixed to one of the accessory device mount and the back plate, and the second mounting slot is positioned on the other of the base plate and the accessory device mount to form a sliding connection in the first direction between the accessory device mount and the frame assembly, wherein the first mounting block and the second mounting block are aligned with each other in the first direction.

\* \* \* \* \*